(12) United States Patent
Coop

(10) Patent No.: US 7,545,274 B2
(45) Date of Patent: Jun. 9, 2009

(54) RFID DATA MANAGEMENT SYSTEM

(75) Inventor: William P. Coop, Kent, WA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 11/401,653

(22) Filed: Apr. 10, 2006

(65) Prior Publication Data

US 2007/0241908 A1 Oct. 18, 2007

(51) Int. Cl.
*G08B 13/14* (2006.01)
*G08B 25/00* (2006.01)

(52) U.S. Cl. .................. 340/572.1; 340/572.8; 340/524
(58) Field of Classification Search ............... 340/572.1
See application file for complete search history.

(56) References Cited

U.S. PATENT DOCUMENTS

| 7,183,924 B1 * | 2/2007 | Ku ........................... 340/572.1 |
| 7,239,242 B2 * | 7/2007 | Ghosh ...................... 340/572.1 |
| 2003/0023518 A1 * | 1/2003 | Spriggs et al. ................. 705/28 |
| 2003/0187823 A1 * | 10/2003 | Ahl et al. .......................... 707/1 |
| 2004/0024501 A1 * | 2/2004 | Muehl et al. ................... 701/29 |
| 2004/0108378 A1 * | 6/2004 | Gatz ........................... 235/385 |
| 2005/0091010 A1 * | 4/2005 | Fox et al. ....................... 703/1 |
| 2007/0013690 A1 * | 1/2007 | Grimaud et al. ............. 345/419 |
| 2007/0124223 A1 * | 5/2007 | Avery et al. ................... 705/29 |
| 2007/0165021 A1 * | 7/2007 | Hanke ......................... 345/419 |

FOREIGN PATENT DOCUMENTS

WO PCT/US2007/006136 9/2007

\* cited by examiner

*Primary Examiner*—Jeff Hofsass
*Assistant Examiner*—John F Mortell
(74) *Attorney, Agent, or Firm*—Tung & Associates

(57) ABSTRACT

A maintenance data management system uses RFID tags associated with aircraft components to store and manage component attributes such as maintenance and service history, useful in performing aircraft maintenance. A transceiver is used to write data into the tags, read data from the tags and transmit the data to a central database for storage and access by maintenance providers. The data may include the service and maintenance history of the component. Maintenance providers may remotely access the database through the Internet.

20 Claims, 4 Drawing Sheets

RFID DATA MANAGEMENT SYSTEM

FIELD OF THE INVENTION

This invention generally relates to the maintenance of aircraft, and deals more particularly with a system for managing maintenance data stored on RFID tags associated with components on the aircraft that require periodic maintenance or replacement.

BACKGROUND OF THE INVENTION

The maintenance of commercial aircraft requires the coordination of multiple service and part suppliers, and the exchange of information relating to components on the aircraft that require service, maintenance or replacement. In the past, maintenance and service information for aircraft components was primarily logged by service personnel who were required to retrieve written records when servicing or replacing components. For example, in diagnosing onboard hardware problems, maintenance personnel often need to know the service history of a particular component in order to determine whether it might be the source of a hardware problem. This procedure necessarily requires service personnel to retrieve information about the component that was often stored off-board the aircraft.

The conventional procedure for identification of in-service and onboard aircraft components during aircraft maintenance operations is through visual identification by way of reading labels and/or part numbers affixed to the components. The problem with such conventional procedures is that reading labels or part numbers is a time consuming and difficult process, particularly in adverse weather conditions, darkness and/or crowded or cramped spaces. As part of the identification process, maintenance technicians often use awkward tools such as flashlights and mirrors and in many cases are required to remove access panels or other components, sometimes unnecessarily in order to gain visual access to aircraft components for visual identification. This approach can result in errors and long delays in flight schedules, as well inadvertent part removal, physical injury and aircraft damage.

More recently, in order to store information relating to the service and maintenance history of onboard aircraft components, it has been proposed to use RFID (Radio Frequency Identification) tags which are associated with, and often affixed to the aircraft components. Complete service and maintenance histories can thus be stored on and retrieved from the RFID tags by service personnel, obviating the need for retrieving off-site records. RFID tags comprise small radio tags or transponders containing a unique code together with other additional information that can be specified by the user and read by a reader/encoder from a distance without contact or line-of-site with the RFID tag. Tagging and tracking of products and devices utilizing RFID tags is widely used in manufacturing and packaging processes, but has seen limited use in labeling individual components on aircraft.

The use of RFID tags to identify aircraft components and store related maintenance information solves many of the problems discussed above. However, widespread use of the tags will result in the accumulation of a large amount of data that must be stored, managed and easily retrieved by service personnel.

Accordingly, there is a need in the art for an RFID data management system that overcomes the problems of the prior art discussed above. The present invention is directed toward satisfying this need.

SUMMARY OF THE INVENTION

According to one aspect of the invention, a method is provided for managing maintenance data for aircraft components, comprising the steps of associating an RFID tag with each of a plurality of components on the aircraft, and electronically displaying at least a section of the aircraft showing the location of the components within the section having associated tags. Electronic data is written into the tags which relate to the associated components, and at least portions of the data written into the tags are displayed to a user, such as service personnel. The displayed data read from the tags may include, for example, the operating or maintenance history of the component, the configuration of the aircraft in which the component is installed, the date the component was manufactured, part or serial number information for the component and the name of the supplier of the component. The method may also include selecting a component within the aircraft section being displayed, retrieving data stored in a database and simultaneously displaying the selected component and data retrieved from the database. The displayed aircraft image is preferably a three dimensional transparent image which visually displays each of the components having an associated RFID tag.

According to another aspect of the invention, a method is provided for managing data related to the maintenance of aircraft components, comprising the steps of: associating an RFID tag with each of the components; storing data on each of the tags including data identifying the component and data related to maintenance of the aircraft; reading the data stored in the tags; storing the data in a maintenance information database; and, retrieving information from the database for use in performing maintenance on the aircraft. The method preferably includes displaying an image of at least a section of the aircraft, visually representing on the aircraft display those components having associated RFID tags and displaying in association with the visual representation of the components, the data retrieved from the database.

In accordance with still another aspect of the invention, a system for managing maintenance data related to aircraft components comprises: an RFID tag associated with each of the components and operative for transmitting data related to the associated component; a reader for reading the data transmitted by each of the RFID tags; a database storage for storing maintenance data including data read by the reader; and, a user interface tool for retrieving maintenance data from the database storage and for displaying the retrieved data. The maintenance data preferably includes data identifying the component, and data representing attributes of the component. The data read by the reader includes service history of the component.

An important advantage of the invention is that maintenance and service history information for components on a fleet of aircraft can be stored and managed in a central database. Another significant feature of the invention is that maintenance and other service personnel can readily access the database information from either onboard or off-board the aircraft. By simultaneously displaying sections of the aircraft showing the components with RFID tags, along with data stored on the tags, service personnel can quickly identify the service and maintenance status of components on the aircraft, as well as their location.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
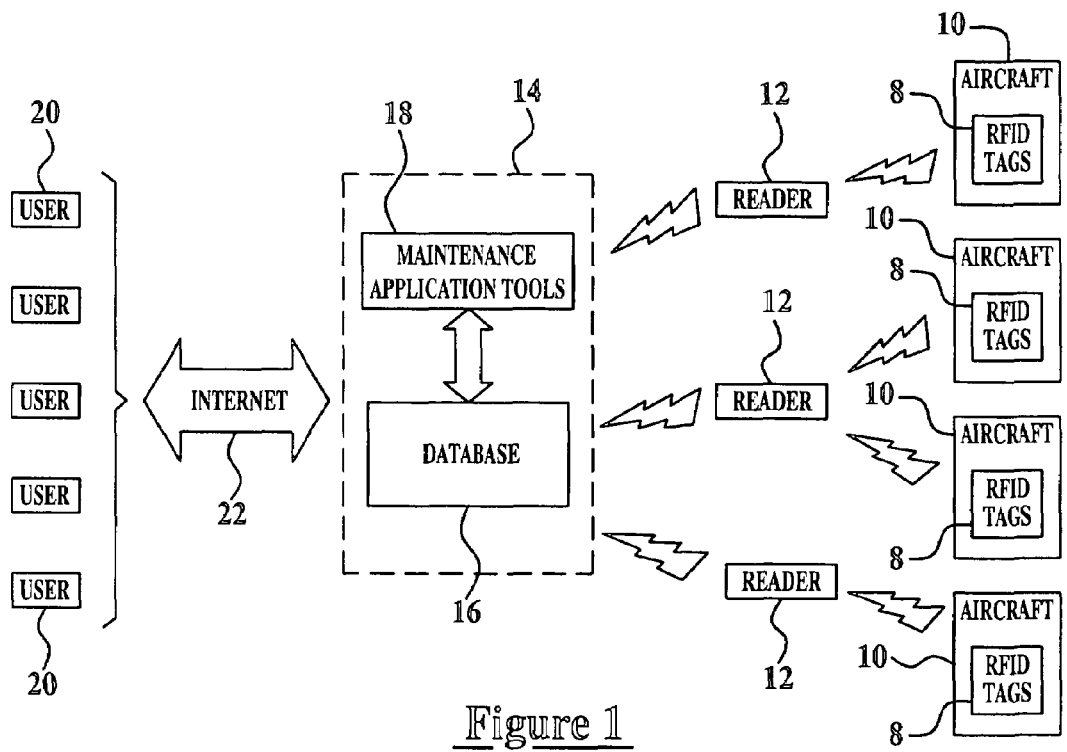
FIG. 1 is an overall block diagram showing an RFID data management system forming the preferred embodiment of the invention.

Referring first to FIG. 1, the present invention broadly relates to a system for managing data that is stored and retrieved from later discussed RFID tags 8 onboard aircraft 10. These RFID tags 8 are associated with individual components or subsystems carried on aircraft 10 and are employed to store information and data related to the associated component, including its attributes and service or maintenance history. The RFID tags 8 may be attached directly to the associated component or physically placed in proximity to the component on the aircraft. The types of information stored on the RFID tags 8 will be discussed later in more detail.

The RFID tags 8 located on the aircraft 10 are of the passive type, but may instead be active where approved by airline regulation authorities. Active RFID tags are typically powered by an internal battery and include both read and write modes, i.e., tag data can be re-written and/or modified. Passive RFID tags operate without an internal power source and obtain operating power that is generated by a reader 12. Passive RFID tags have shorter read ranges than active tags and require a higher powered reader 12. RFID tags are advantageous in that they utilize non-contact, non-line-of-site wireless technology to read and write data. Additional details of suitable RFID tags 8 and their use in tagging aircraft components is described in U.S. provisional patent application Ser. No. 60/718,682, filed Sep. 20, 2005, the entire disclosure of which is incorporated by reference herein.

The readers 12 may comprise hand-held, portable units utilized by service or maintenance personnel on or near the aircraft. Alternatively, the readers 12 may comprise fixed units that are mounted onboard the aircraft or off-board at stationary locations such as maintenance hangers or airport gates. A single reader 12 may be used to read RFID tags 8 from multiple aircraft 10, or a single aircraft 10.

Tag data retrieved by readers 12 is wirelessly transmitted by any of a number of suitable wireless links to a database management system 14 comprising a database 16 of RFID tag information communicatively connected with one or more maintenance application tools 18. The database 16 may include the information stored on each of the RFID tags 8, as well as a variety of other information related to the component associated with the tag 8, as well as information about the aircraft 10 and its configuration. The RFID tag data stored in the database 16 may include, for example, the maintenance and operational history of the associated component, the configuration of the aircraft 10 or related subsystems, safety and human factor information and a variety of other attributes of the component.

A variety of maintenance application tools 18 may advantageously use the data stored in database 16 to carry out various tasks associated with operating, servicing and maintaining the aircraft 10. One of the maintenance application tools 18 may comprise, for example, a maintenance performance tool box (MPT) more fully described in U.S. Patent Application Publication No. US2003/0187823 A1 published Oct. 2, 2003, U.S. Patent Application Publication No. US2005/0177540 A1, published Aug. 11, 2005, and U.S. patent application Ser. No. 11/281,280 filed Nov. 16, 2005, the entire contents of all of which are incorporated by reference herein.

The MPT uses 3-D airframe models and schematics of aircraft systems as "graphical" tables of content that enable point and click access to all of the information related to a specific aircraft location or component. Advanced data mining techniques and search capabilities are used by the MPT to collect relevant information (e.g. fault code lookup, repaired history, maintenance procedures, part numbers, maintenance tasks) into the troubleshooting process. The MPT gives maintenance personnel such as mechanics, fast and efficient access to technical information using intuitive navigation techniques that help the user construct a mental image of the solution and takes the user directly to the applicable information. Real time information updates insure that the customer has access to the most current technical information. The MPT also is useful in assisting aircraft users to manage parts and materials. It may thus be appreciated that the RFID tag data stored in the database 16 is a valuable resource that may be used by application tools 18 such as the MPT to provide users with real time information useful in servicing and maintaining the aircraft 10.

A plurality of users 20 may gain access to and use a maintenance system 14 using the internet 22 or other network interface. The users 20 may comprise maintenance personnel aircraft manufacturers, aircraft customers/owners or MRO's (maintenance and repair organizations), for example.

Figure 2:
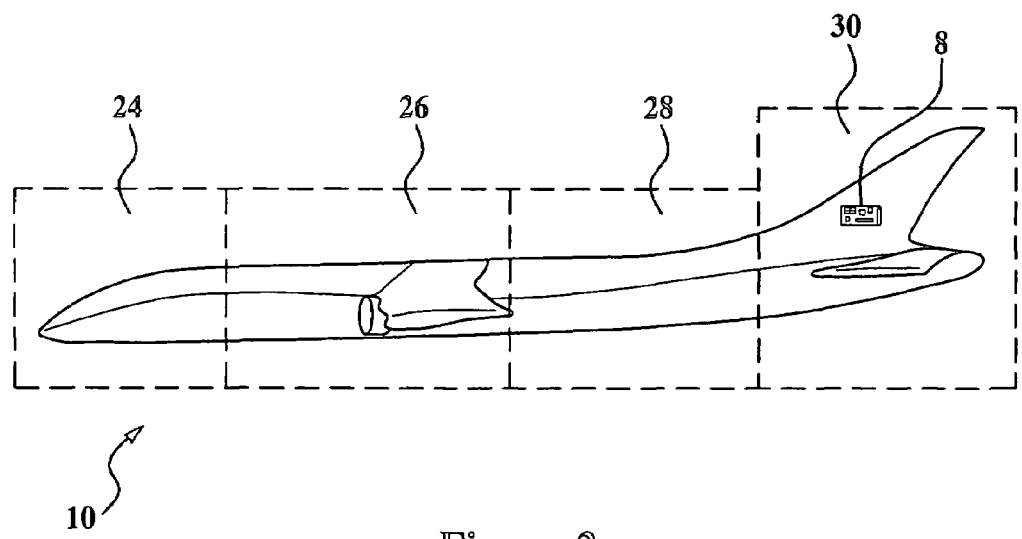
FIG. 2 is a side view showing an aircraft divided into sections used in the data management system shown in FIG. 1.

In order to aid a user in quickly navigating to components and data of interest, the database information arranged to be accessed using a variety of selectable criteria such as systems, subsystems, component name, zone or aircraft section. For example, as shown in FIG. 2, the aircraft 10 may be divided into a plurality of broad physical sections 24-30 which are displayed to a user on a computer screen. The user may select a particular one of the sections 24-30 for further interrogation. For example, if a maintenance person wishes to review data related to components known to be located in the tail section 30, the person simply points and clicks-on section 30, whereupon transparent views of the tail section 30 will be displayed that identify each of the components in the tail section 30 that have an RFID tag 8 associated therewith.

Figure 3:
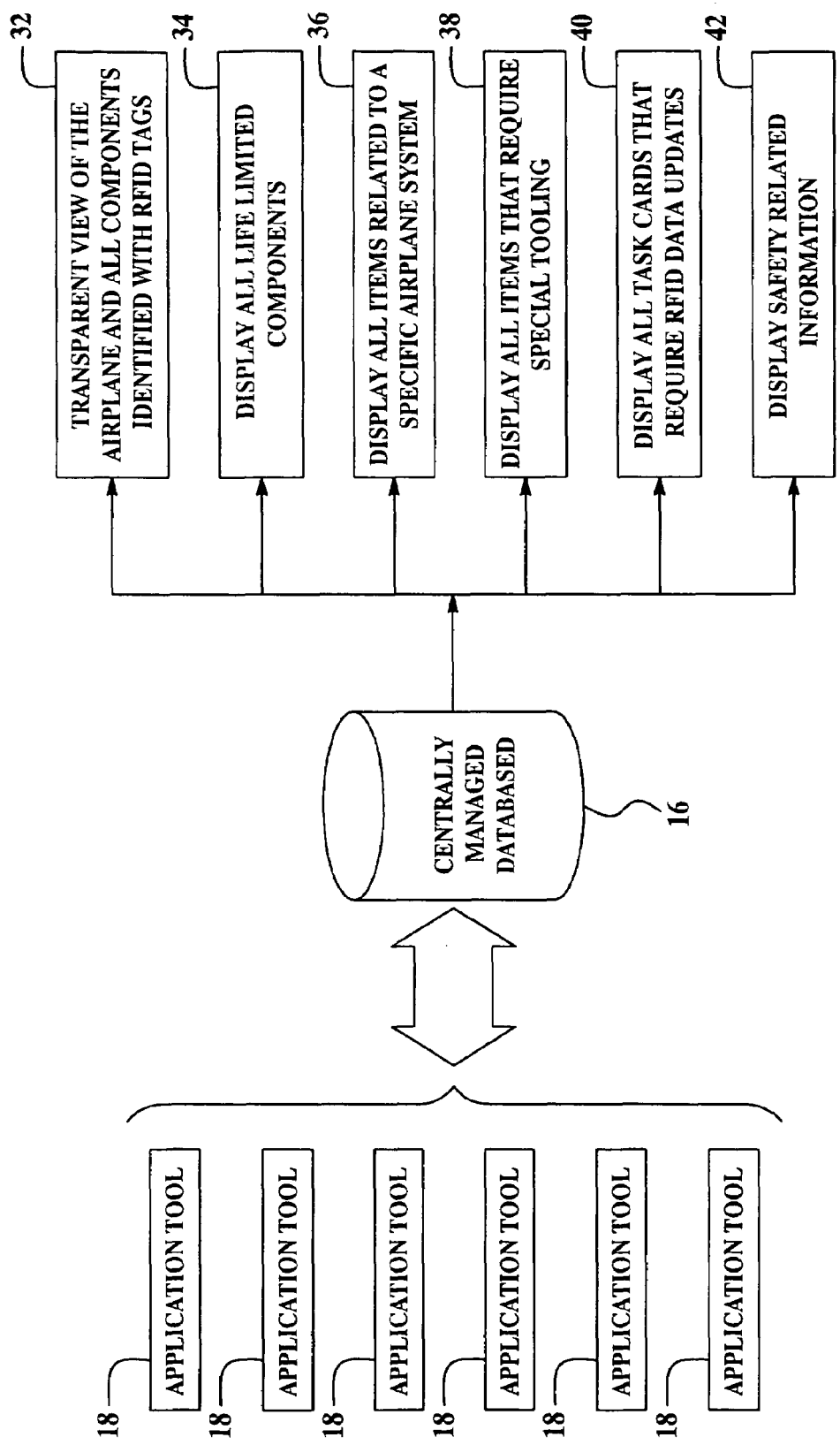
FIG. 3 is a block diagram showing how application tools may be used with a centrally managed database to display information useful in aircraft maintenance service.

FIG. 3 shows how a user may use one or more of the application tools 18 to access information in the centrally managed database 16 in order to display various items useful in carrying out aircraft maintenance and service. For example, the user may select a display of the transparent view of the aircraft at 32 which shows all aircraft components having associated RFID tags 8. The user. may select for display at 34 all life limited components, or at 36, the display of all items related to a specific aircraft system. Items can be displayed at 38 that have special tooling requirements. Task cards can be displayed at 40 that require RFID data updates and the user may select for display safety related information at 42.

As previously noted, the transparent view displayed at 32 of the components with associated RFID tags 8 may be displayed by either zone, by system or by section of the aircraft. The limited life components displayed at 34 may be grouped or displayed by specific date or specific system. Selecting a display of all limited life components allows the user to immediately identify life limited components and/or life limited component repairs. Maintenance planners can use this information to schedule maintenance activities and/or insure airworthiness.

Examples of specific systems displayed at 36 may include, fuel systems, electrical systems and emergency equipment. The display of all items related to a specific aircraft system allows the user to review specific systems to analyze maintenance or resolve no fault found, root cause analysis issues.

Items requiring special tooling displayed at 38 may include groupings by individual component, by systems or by an associated work package. The display of all items that require special tooling permits maintenance planners to identify specific requirements for specialized tooling needed for maintenance tasks.

Task cards displayed at 40 requiring RFID data updates may be displayed by individual card, by system or by work package. The display of task cards requiring RFID data updates allows maintenance planners to control the use of RFID readers and other equipment.

Safety related information displayed at 42 may be provided by component, by system or by task card. Display of safety related information permits users to view important safety data such as material hazards, lifting restrictions, RII requirements, LMP requirements, ESDS requirements, safety of flight concerns, specialized mechanic training and qualifications and environmental concerns.

Cycle times may be displayed for specific component removal and installation tasks in order to allow maintenance planners to review capacity needs for specific tasks or work packages. Inoperable RFID tags 8 may be displayed to allow maintenance planners to schedule RFID tag replacement. Planners can preprogram the replacement tag before installing it on a component by using the information in the database 16. Interchangeability options for specific components can be displayed to allow maintenance planners to identify inventory options. Aircraft configurations can be displayed to allow maintenance technicians to perform configuration and/or component data checks while the aircraft is in service.

Recurring inspections can be displayed to allow maintenance planners to review any and all required recurring inspections prior to maintenance induction for the purpose of determining capacity requirements.

Various OEM requirements can be displayed to allow planners to identify and ensure that OEM data entry requirements are met for every component removal.

Obviously, a wide variety of data may be displayed in text form in various categories or graphically by component, system, etc. in relation to their location on the aircraft 10.

Figure 4:
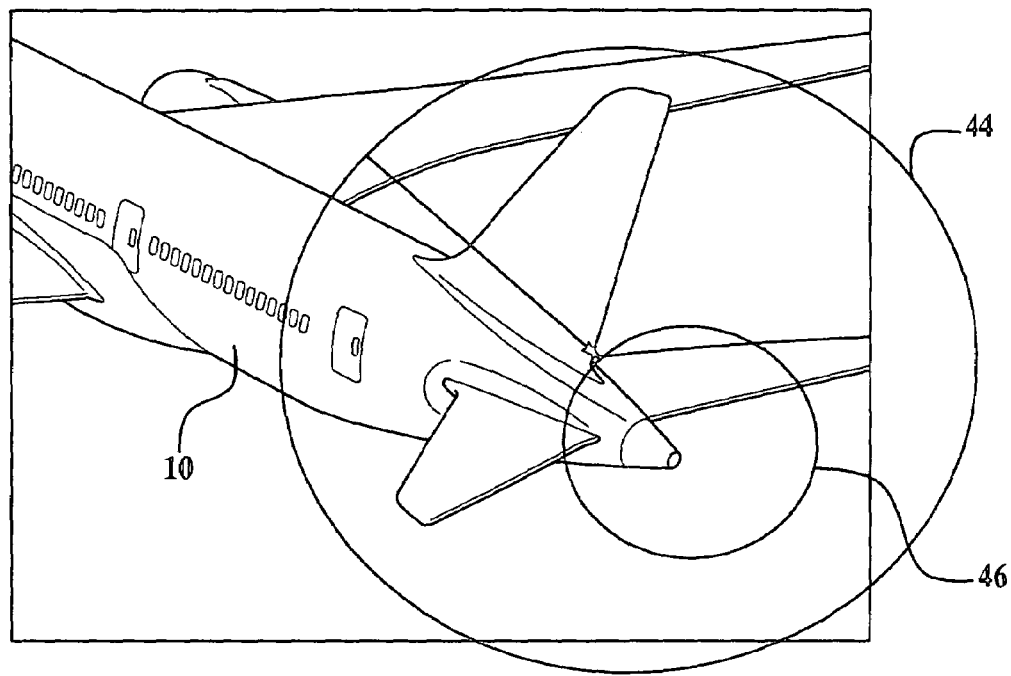
FIG. 4 is a screen display of a section of the aircraft shown in FIG. 2, showing navigational aids.
Figure 5:
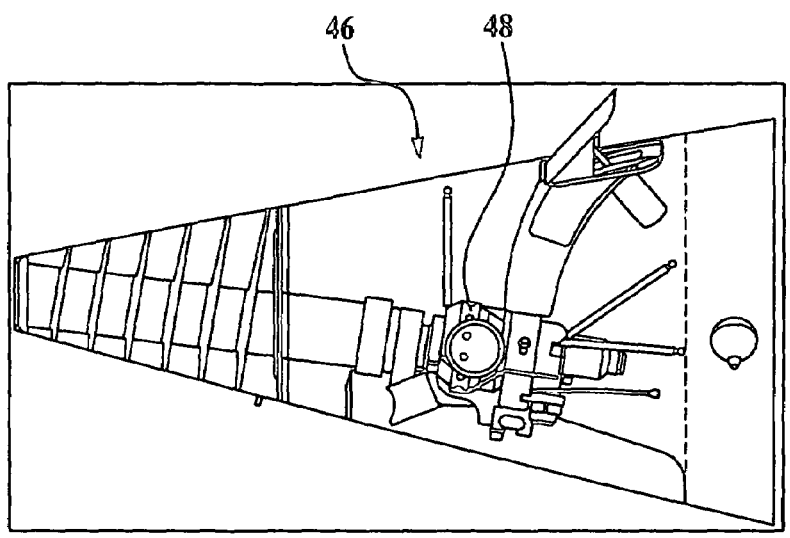
FIG. 5 is a diagrammatic view showing aircraft components within a user selected subsection of the aircraft section shown in FIG. 4.

From the above, it is apparent that the RFID data management system of the present invention provides the user with an E-enabled tool that allows the user to display a transparent, 3-D view of an aircraft with a superimposed 3-D image of every component having an associated RFID tag. The user has the ability to select any component, group of components, or section of the aircraft for examination and interrogation. The user also has the ability to select from lists of attributes for any given component, group of components or section of the aircraft. One such 3-D display of the aircraft 10 is shown in FIG. 4 wherein the tail section 30 (FIG. 2)is shown within a larger highlighted circle 44. Using point and click software, the user may position a cursor on a particular area of the tail section within circle 44, such as the aft section 46 where an auxiliary power unit (APU) is known to be located. The user clicks on the aft portion 46 the tail section, resulting in the display on the user's terminal of the image shown in FIG. 5. The aft portion 46 of the tail section shown in FIG. 5 reveals the major components located in this section, including the APU 48. The user may then request a display of those components in the aft portion 46 which has associated RFID tags, whereupon the image shown in FIG. 6 is displayed to the user.

Figure 6:
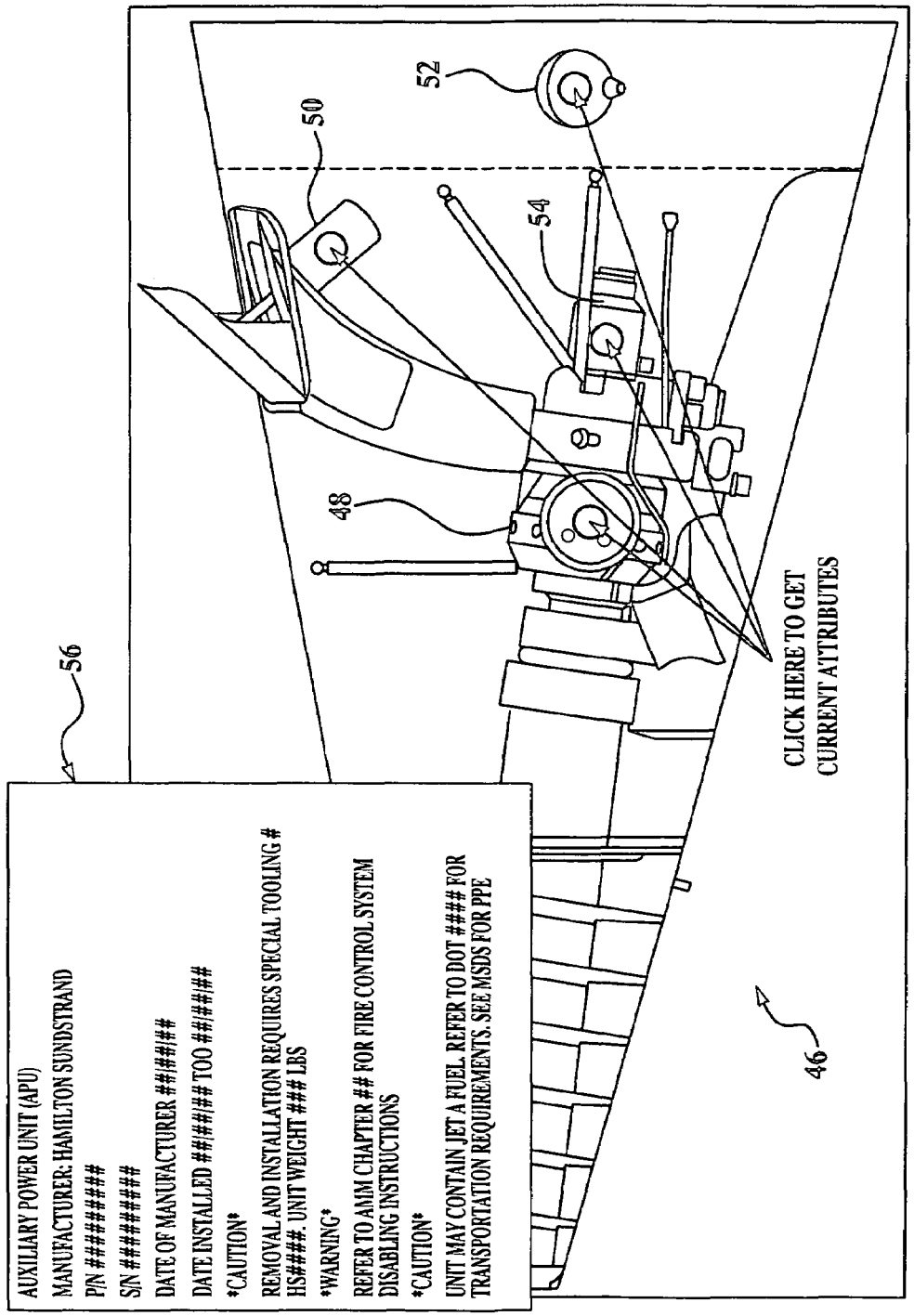
FIG. 6 is a user screen display showing the components depicted in FIG. 5, together with attribute information for one of the selected components.

In FIG. 6, each of the major components within the aft portion 46 of tail section 30 is shown, and those components 48-52 having associated RFID tags 8 are clearly designated with highlighted areas that may be clicked-on in order to access the attributes of the component. The user may then click on one of the highlighted areas of the components, such as the APU 48, whereupon a text box 56 is displayed, in juxtaposed relationship to the APU 48, which shows the attributes of the APU 48. In the illustrated example, the attributes shown in text box 56 include the part and serial numbers, date of manufacture, date of installation and a series of caution and warning notes relating to the service and maintenance of the APU 48. The user may update the tag information as necessary using a reader 12 in which event the tag data is updated in the database 16.

Although this invention has been described with respect to certain exemplary embodiments, it is to be understood that the specific embodiments are for purposes of illustration and not limitation, as other variations will occur to those of skill in the art.

What is claimed is:

1. A method of managing maintenance data for aircraft components, comprising the steps of:
   (A) associating a radio frequency identification tag (RFID) with each of a plurality of components on the aircraft; and,
   (B) accessing a database to retrieve graphical data, said data base comprising graphical data comprising said aircraft and said plurality of components and electronically displaying using said graphical data at least a section of the aircraft and showing the location of the components having the associated RFID tags.

2. The method of claim 1, further comprising the step of:
   (C) writing data into each of the RFID tags associated with a respective one of the components.

3. The method of claim 2, wherein step (B) includes displaying at least portions of the data written into the each of the RFID tags associated with a respective one of the displayed components.

4. The method of claim 3, wherein the displayed data of a respective one of the displayed components includes at least one of the following:
   a) the operational history of the component;
   b) the maintenance history of the component;
   c) information related to the configuration of the aircraft in which the component is installed;
   d) the date the component was manufactured
   e) the name of the supplier of the component;
   f) the serial number of the component; and,
   g) the part number of the component.

5. The method of claim 1, wherein at least certain of the RFID tags are physically attached to a respectively associated component.

6. The method of claim 2, further comprising the steps of:
(D) reading the data written into each of the tags in step (C); and
(E) storing the data read in step (D) in said database.

7. The method of claim 6, further comprising the step of selecting a component within the aircraft section displayed in step (B), and wherein step (B) includes:
retrieving data stored in the database in step (E) related to the selected component, and simultaneously displaying the selected component and data retrieved from the database.

8. The method of claim 6, further comprising the step of retrieving the data stored in step (E) using the Internet.

9. The method of claim 2, wherein step (B) includes generating a transparent image of the aircraft displaying each of the components having an associated RFID tag.

10. The method of claim 1, further comprising the steps of:
(C) generating a view showing multiple sections of the aircraft, and
(D) selecting one of the sections generated in step (C) to be displayed in step (B).

11. The method of claim 1, further comprising the steps of:
(C) selecting a component within the aircraft section displayed in step (B);
(D) displaying the component selected in step (C); and,
(E) displaying attributes of the selected component.

12. A method of managing data related to the maintenance of aircraft components, comprising the steps of:
(A) associating a radio frequency identification tag (RFID) with each of the components;
(B) storing data on each of the RFID tags;
(C) said data comprising data identifying the associated components and data related to maintenance of the aircraft;
(D) reading the data stored on the RFID tags;
(E) storing the data read in step (D) in a maintenance information database; and,
(F) retrieving data from the database for use in performing maintenance on the aircraft, said data comprising textual data stored on said RFID tags and graphical data comprising a graphical representation of said aircraft and said components having associated RFID tags.

13. The method of claim 12, further comprising the steps of:
(G) displaying an image of at least a section of the aircraft using said graphical data;
(H) graphically representing on the displayed aircraft section at least one of the components having associated RFID tags using said graphical data; and,
(I) displaying the textual data retrieved in step (F) in association with the graphical representations of at least one of the components.

14. The method of claim 13, wherein the textual data displayed in step (I) includes at least one of the following:

a) the operational history of the component;
b) the maintenance history of the component;
c) information related to the configuration of the aircraft in which the component is installed;
d) the date the component was manufactured;
e) the name of the supplier of the component;
f) the serial number of the component; and,
g) the part number of the component.

15. The method of claim 12, further comprising the steps of:
(G) electronically displaying an image of said components having associated RFID tags, said image comprising at least a section of the aircraft;
(H) selecting a component in the image displayed in step (G); and,
(I) displaying the textual data retrieved in step (F) in association with a graphical representation of the selected component.

16. The method of claim 12, further comprising the steps of:
(G) generating a three dimensional transparent image of the aircraft using said graphical data;
(H) displaying a graphical representation of at least one of the components having an associated RFID tag within the transparent image using said graphical data;
(I) selecting a component displayed in step (H); and,
(J) displaying in juxtaposed relationship to the selected component the textual data retrieved in step (F).

17. The method of claim 12, wherein steps (E) and (F) are performed by coupling a maintenance user interface with the database, said coupling comprising using the Internet.

18. A system for managing maintenance data related to aircraft components, comprising:
a radio frequency identification (RFID) tag associated with each of the components and operative for transmitting data relating to the associated component;
a reader for reading the data transmitted by each of the RFID tags;
a database storage for storing maintenance data, including the data read by the reader, said database storage comprising graphical representations of said aircraft and said components; and,
a user interface tool for retrieving said maintenance data and said graphical representations from the database storage, and for displaying the retrieved data, said displayed data comprising a graphical representation of a location of said components in said aircraft and said maintenance data juxtaposed to a component associated with a respective RFID tag.

19. The system of claim 18, wherein the maintenance data includes data identifying the component and data representing attributes of the component.

20. The system of claim 18, wherein the data read by the reader includes the service history of the component.

* * * * *